United States Patent
Zhang et al.

(10) Patent No.: US 8,611,431 B2
(45) Date of Patent: Dec. 17, 2013

(54) METHOD AND APPARATUS FOR TRANSMITTING DATA

(71) Applicant: Thomson Licensing, Issy de Moulineaux (FR)

(72) Inventors: Benyuan Zhang, Cherry Hill, NJ (US); Wen Gao, West Windsor, NJ (US); Kumar Ramaswamy, Princeton, NJ (US); Paul Gothard Knutson, Westfield, IN (US); Joshua Lawrence Koslov, Hopewell, NJ (US); Manoj Viswambharan, Morganville, NJ (US); Yik Chung Wu, West Windsor, NJ (US)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 13/651,332

(22) Filed: Oct. 12, 2012

(65) Prior Publication Data

US 2013/0042290 A1  Feb. 14, 2013

Related U.S. Application Data

(63) Continuation of application No. 12/227,112, filed as application No. PCT/US2006/048320 on Dec. 19, 2006, now Pat. No. 8,315,314.

(60) Provisional application No. 60/799,625, filed on May 11, 2006.

(51) Int. Cl.
| | |
|---|---|
| *H04N 11/02* | (2006.01) |
| *H04N 7/12* | (2006.01) |
| *H04N 7/16* | (2011.01) |
| *H04N 5/52* | (2006.01) |
| *H04N 5/38* | (2006.01) |
| *H04N 5/44* | (2011.01) |
| *H04N 21/43* | (2011.01) |
| *H03C 1/52* | (2006.01) |

(52) U.S. Cl.
USPC ........... 375/240.26; 375/240.01; 375/240.28; 375/301; 348/384.1; 348/723; 348/725; 725/62; 725/116; 725/148

(58) Field of Classification Search
USPC ................. 375/240.01, 240.26, 240.28, 301; 348/384.1, 723, 725; 725/62, 116, 148
See application file for complete search history.

(56) References Cited

U.S. PATENT DOCUMENTS

| | | | |
|---|---|---|---|
| 6,075,569 A | 6/2000 | Lee et al. | |
| 2002/0140867 A1* | 10/2002 | Weiss | 348/723 |
| 2003/0152107 A1 | 8/2003 | Pekonen | |
| 2003/0162543 A1 | 8/2003 | Auranen et al. | |
| 2003/0166392 A1 | 9/2003 | Laiho et al. | |
| 2004/0029591 A1 | 2/2004 | Chapman et al. | |
| 2004/0190629 A1 | 9/2004 | Cooper et al. | |
| 2004/0199683 A1* | 10/2004 | Asmuth | 710/52 |
| 2005/0018615 A1 | 1/2005 | Itoh et al. | |
| 2005/0089103 A1 | 4/2005 | Choi et al. | |
| 2005/0157650 A1 | 7/2005 | Laiho et al. | |
| 2005/0243947 A1* | 11/2005 | Harold-Barry et al. | 375/300 |
| 2006/0034321 A1* | 2/2006 | Paila et al. | 370/464 |
| 2006/0159183 A1* | 7/2006 | Gaddam et al. | 375/240.26 |
| 2006/0253890 A9 | 11/2006 | Park et al. | |
| 2006/0291386 A1 | 12/2006 | Jyske et al. | |
| 2007/0002870 A1 | 1/2007 | Pekonen et al. | |
| 2007/0071013 A1 | 3/2007 | Rooyen | |
| 2007/0101228 A1 | 5/2007 | Vesma et al. | |
| 2007/0110105 A1 | 5/2007 | Usuki et al. | |
| 2007/0188665 A1 | 8/2007 | Watson et al. | |
| 2007/0277077 A1 | 11/2007 | Vesma et al. | |
| 2008/0022340 A1* | 1/2008 | Hannuksela et al. | 725/112 |
| 2008/0276287 A1* | 11/2008 | Mizuta | 725/62 |
| 2009/0268648 A1 | 10/2009 | Tardy et al. | |
| 2010/0171877 A1 | 7/2010 | Markman et al. | |

FOREIGN PATENT DOCUMENTS

| | | |
|---|---|---|
| EP | 0844760 | 5/1998 |
| EP | 1509043 | 2/2005 |
| GB | 2406483 | 5/2005 |
| JP | 06165130 | 6/1994 |
| JP | 2000332708 | 11/2000 |
| JP | 2003338830 | 11/2003 |

| | | |
|---|---|---|
| JP | 2004537226 | 12/2004 |
| JP | 2005529506 A | 9/2005 |
| WO | WO03010975 | 2/2003 |
| WO | WO03105386 | 12/2003 |
| WO | WO2005002086 | 1/2005 |
| WO | WO2005043784 | 5/2005 |
| WO | WO2005117444 | 12/2005 |
| WO | WO2006001635 | 1/2006 |
| WO | WO2006030329 | 3/2006 |

OTHER PUBLICATIONS

Yong, et al. "A Novel Scheme for Symbol Timing in OFDM WLAN Systems", International Symposium on Communications and Information Technologies (ISCIT 2004). Sapporo, Japan. Oct. 26-29, 2004. pages 642-645.

ATSC, "Proposal for an Improved ATSC DTV Standard" (Revision to A/53), S9-4-001, Jan. 1, 2006, pp. 1-22.

European Telecommunications Standards Institute, "Digital Video Broadcasting (DVB); DVB-H Implementation Guidelines", Feb. 2005, pp. 1-81.

European Telecommunications Standards Institute, Digital Video Broadcasting (DVB); Trans Sys for Hand Term (DVB-H), ETSI EN 302 304 v1.1.1., Nov. 2004, pp. 1-14.

Furht, "Interactive Television Systems," Proceedings of the 1996 ACM Symposium on Applied Computing, 1996, pp. 7-11.

Jaekel, "Time-Slices—Wesentliches Merkmal Von DVB-H" FKT Renseh UND Kinotechnik, Fachverlag Schlele & Schon GmbH, Berkin, DE, vol. 60, No. 3, 2006, pp. 135-138.

Kornfeld M. et al., "DVB-H Digitaler Rundfunk Fuer Smartphone, PDA&CO", FKT Femseh Und Kinotechnik, Fachverlag Schlele & Schon GmbH, Berlin, DE, vol. 59, No. 1/2, 2005, pp. 35-42.

Poynton, "Digital Video and HDTV, Alorithms and Interfaces", 2003, Morgan Kaufmann Publishers, pp. 587-592.

Samsung/Rohde & Schwarz, "SRS & Turbo Stream", To understand A-VSB System, ATSC S9-4 TC Meeting, Mar. 20, 2006.

Tsuchiya et al., Quality Improvement Method Using Double Error Correction in Burst Transmission Systems, IEEJ Trans. EIS, vol. 124, No. 1, 2004, pp. 84-93.

International Search Report dated Aug. 17, 2007.

\* cited by examiner

*Primary Examiner* — Joseph Ustaris
*Assistant Examiner* — On S Mung
(74) *Attorney, Agent, or Firm* — Robert D. Shedd; Brian J. Dorini

(57) ABSTRACT

An implementation exits a power saving mode for fixed and periodic active periods of time to receive a separate burst transmission from a first stream during each of the corresponding active periods of time. The first stream is received at a first-stream burst data rate. The first stream includes data configured to be displayed at a first playback rate that is substantially less than the first-stream burst data rate. During the active periods of time, data is received from a second stream at a second-stream rate. The second stream includes data configured to be displayed at a second playback rate that is substantially the same as the second-stream rate. After receiving each of the burst transmissions from the first stream during the active periods of time, the power saving mode is entered for corresponding fixed and periodic power-saving periods of time while waiting for another burst from the first stream.

18 Claims, 15 Drawing Sheets

METHOD AND APPARATUS FOR TRANSMITTING DATA

CROSS REFERENCES

This application claims the benefit of U.S. patent application Ser. No. 12/227,112, filed Dec. 19, 2006, and titled "Method and Apparatus for Transmitting Data," which claims the benefit of (i) PCT/US2006/048320, filed Dec. 19, 2006, and (ii) U.S. Provisional Patent Application Ser. No. 60/799,625, filed May 11, 2006, and titled "Protocol for Mobile Reception and Other Environments". Each of these three benefit applications are incorporated by reference herein in their entirety for all purposes.

FIELD OF THE INVENTION

This disclosure relates to broadcasting of digital information.

BACKGROUND OF THE INVENTION

In broadcasting using the existing ATSC (Advanced Television Systems Committee) A/53 standard for digital television broadcasting, data is transmitted continuously. Receivers continuously demodulate all of the information received. In a system using a version of the ATSC A/53 protocol, the available bandwidth is over 19 Mbps, and a high data transfer rate is provided. As a result of the large data transfer rate, the power consumption requirements of the demodulator can be significant.

SUMMARY

According to one general aspect, a transmitter transmits a first set of data, the transmissions of sequential portions of data constituting the first set of data being separated by respective time intervals having lengths configured to allow a receiver to enter a power saving mode and then exit the power saving mode between receiving sequentially transmitted portions of data constituting the first set of data. The transmitter transmits a second set of data, the second set of data constituting a user-selectable program, the transmissions of all portions of the second set of data being separated by respective time intervals having lengths that are not configured to allow a receiver to enter the power saving mode and then to exit the power saving mode between receiving sequentially transmitted portions constituting the second set of data.

According to another general aspect, a receiver exits a power saving mode for a fixed receiving period of time in order to receive a burst transmission from a first stream. The receiver receives, during the fixed receiving period of time, the burst transmission from the first stream. The receiver receives, during the fixed receiving period of time, data from a second stream at the receiver. The receiver discards the data received from the second stream, and enters the power saving mode for a fixed power-saving period of time while waiting for another burst from the first stream.

According to another general aspect, a transmitter accesses a stream of data and divides the stream of data into a series of bursts. The series of bursts is then transmitted, with successive bursts in the series separated in time, over a continuous-mode transmission system.

According to another general aspect, a receiver receives a series of bursts of data in a stream of data. The bursts are received over a continuous-mode transmission system, with successive bursts being separated in time by separation times. The separation times have durations sufficient for the receiver to enter a power saving mode and exit the power saving mode between receiving the successive bursts.

According to another general aspect, a power saving mode is exited at least two times for corresponding fixed and periodic active periods of time at a receiver in order to receive a separate burst transmission from a first stream during each of the corresponding active periods of time. The active periods of time have a first common length of time determined prior to a first of the active periods of time. During the active periods of time, the burst transmissions are received from the first stream at the receiver. The burst transmissions are received over a continuous-mode transmission system. The first stream is received by the receiver at a first-stream burst data rate, and the first stream includes data configured to be displayed at a first playback rate that is substantially less than the first-stream burst data rate. During the active periods of time, data is received from a second stream at the receiver. The data from the second stream is received over the continuous-mode transmission system. The second stream is received by the receiver at a second-stream rate, and the second stream includes data configured to be displayed at a second playback rate that is substantially the same as the second-stream rate. The data received from the second stream is discarded. After receiving each of the burst transmissions from the first stream during the at least two active periods of time, the power saving mode is entered for corresponding fixed and periodic power-saving periods of time while waiting for another burst from the first stream. The power-saving periods of time have a second common length of time determined prior to a first of the active periods of time.

The details of one or more implementations are set forth in the accompanying drawings and the description below. Other features will be apparent from the description and drawings, and from the claims.

DETAILED DESCRIPTION

One or more embodiments provide a method of receiving data and a method of transmitting data which addresses the problem of power management when the data is being transmitted according to a protocol that expects receivers to be on continuously. An example of such a protocol is the ATSC Digital Television Standard (A/53). An example of an application in which power management is desirable is that of mobile devices, which rely on internal power sources, such as batteries. As noted above, as a demodulator must examine all of the data received, the demodulator must continuously process large quantities of data. The demodulator thus has power needs that may be significant relative to the overall power consumption needs of a portable device.

A reduction in the data transfer rate for content specifically provided for mobile devices may reduce power consumption requirements of MPEG decoders and displays, for example. However, in the ATSC A/53 standard, because the demodulator processes all of the data, including the data provided for terrestrial television, a reduction in the data transfer rate for content specifically provided for mobile devices does not significantly reduce the power consumption requirements of the demodulator.

An implementation addresses these challenges by continuously transmitting a first set of data and intermittently transmitting a second set of data, with portions of the second set of data being separated by respective time intervals. The time intervals are sufficiently long to permit a receiver to enter a power saving mode and exit the power saving mode between receiving sequential portions of the second set of data. The first set of data is digital television programming data for terrestrial television, and the second set of data is digital television programming data for use by mobile receivers. An advantage of such an implementation is that power consumption may be reduced in mobile devices compared to power consumption required with a continuously operating demodulator.

Figure 1A:
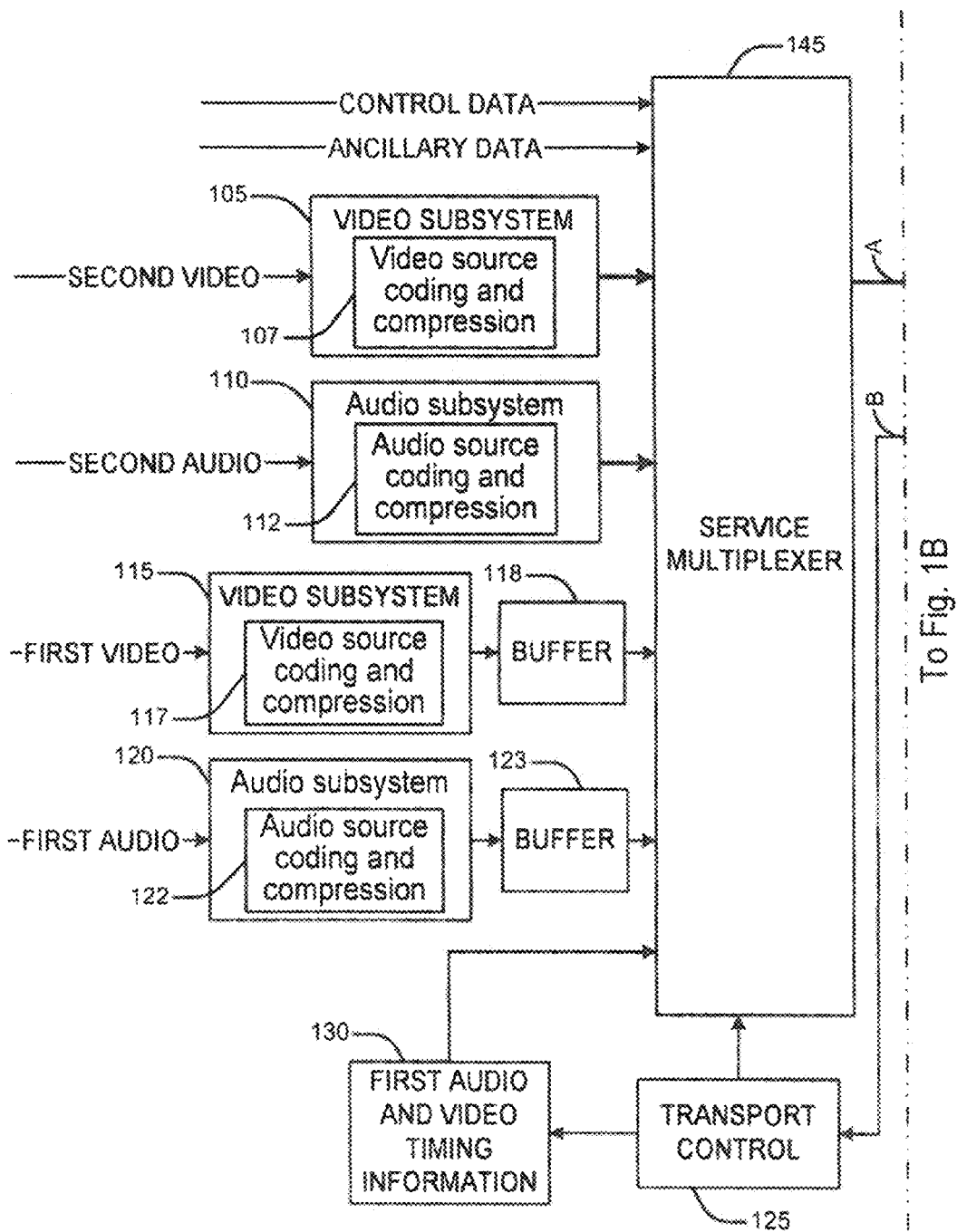
FIG. 1A and FIG. 1B provide a schematic illustration of a system according to an embodiment.
Figure 1B:
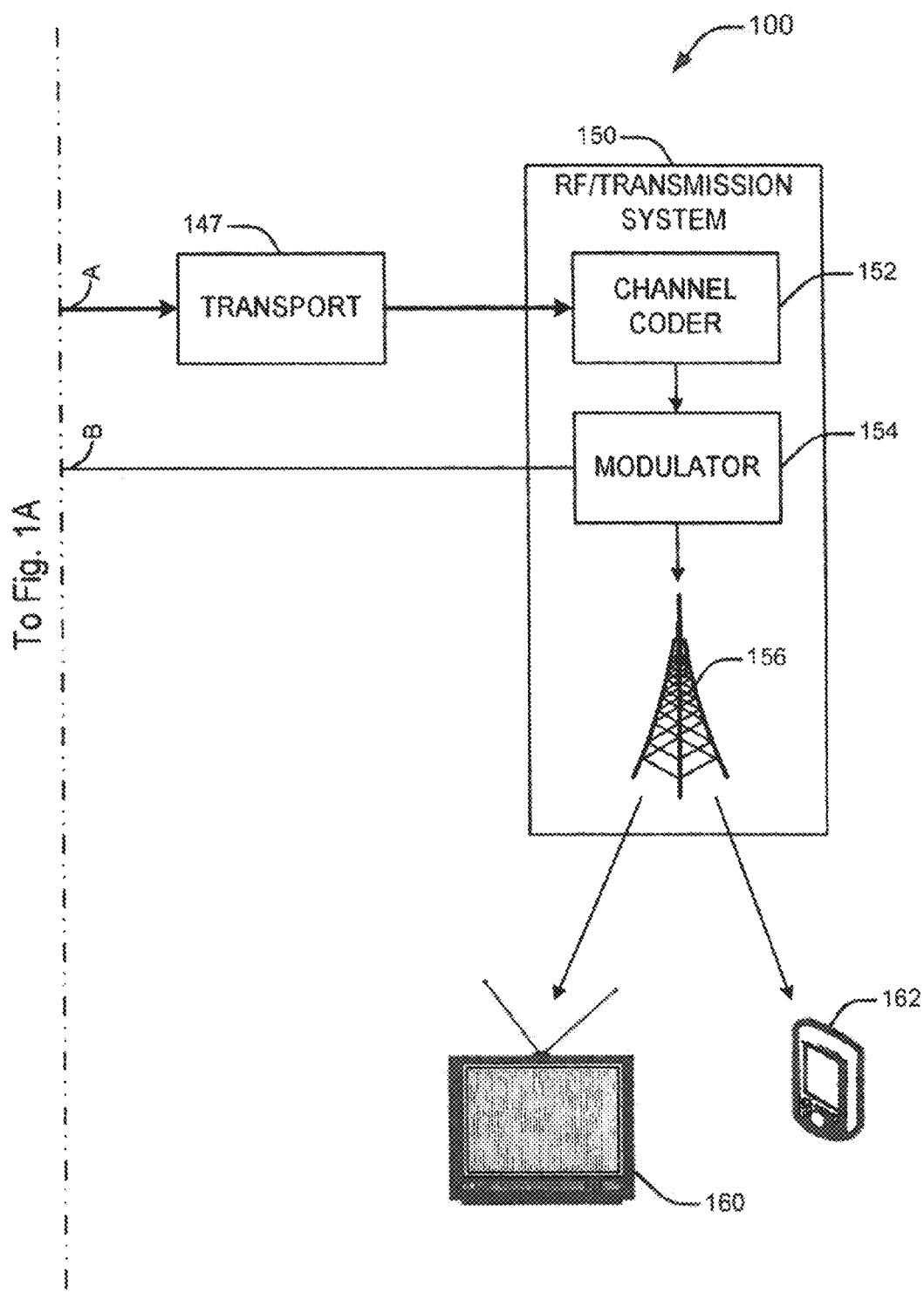

Referring to FIG. 1, which includes FIG. 1A and FIG. 1B, a system 100 is illustrated for transmission and reception of audio and video data. At least first and second data streams are provided. A first data stream may include first audio and first video, as illustrated. A second data stream may include second audio and second video, as illustrated. The first data stream may include, by way of example, audio and video content, such as television programming, which may be digitized. The second data stream may include, by way of example, audio and video content, such as television programming, which may be digitized. In an embodiment, the first data stream may include relatively smaller amounts of data for each frame to be displayed. The first data stream may include television programming intended for transmission and display on relatively small displays, by way of example. A particular program or portion of a program in the first data stream may be deemed a first set of data. A particular program or portion of a program in the second data stream may be deemed a second set of data.

A video subsystem for the second video is shown at 105, and includes video source coding and compression 107. Video source coding and compression may include hardware and software for providing bit rate reduction. By way of example, coding and compression 107 may include hardware and software for coding data in accordance with the MPEG-2 video stream syntax. An audio subsystem for the second audio stream is shown at 110. Audio subsystem 110 may include audio source coding and compression 112. By way of example, audio source coding and compression 112 may include hardware and software for coding in accordance with the Digital Audio Compression (AC-3) Standard.

Video subsystem 115 receives the first video stream and may include video source coding and compression 117, which may include, by way of example, hardware and software for coding and compression in accordance with the MPEG-2 video stream syntax. Audio subsystem 120 receives the first audio stream and may include audio source coding and compression 122. Audio source coding and compression 122 may include hardware and software for coding and compression in accordance with the Digital Audio Compression (AC-3) Standard.

First video subsystem 115 outputs an encoded and compressed video stream to buffer 118. Buffer 118 includes a memory for storage of a portion of the encoded and compressed video stream. Depending on desired characteristics, buffer 118 may include memory for storage of from about 1, 2 or 5 seconds, or less of the encoded and compressed video stream at its playback rate, to about 60, 120 or 300 seconds of the encoded and compressed video stream at its playback rate. Similarly, first audio subsystem 120 outputs an encoded and compressed video stream to buffer 123. Buffer 123 includes a memory for storage of a portion of the encoded and compressed audio stream. Buffer 123 may include memory for storage of from about 1, 2 or 5 seconds, or less of the encoded and compressed audio stream at its playback rate, to about 60, 120, 300 or more seconds of the encoded and compressed audio stream at its playback rate. The storage capacity of both buffer 118 and buffer 123, in terms of playback rate, may be the same or substantially the same.

Second video subsystem 105 outputs an encoded and compressed video stream to service multiplex 145. Second audio subsystem 110 outputs an encoded and compressed audio stream to service multiplex 145. Both second video subsystem 105 and second audio subsystem 110 may output respective video and audio streams at, or substantially at, a corresponding playback rate. Buffer 118 periodically outputs to service multiplex 145 an encoded and compressed video stream, in portions, with intervals between each portion. Buffer 123 periodically outputs to service multiplex 145 an encoded and compressed audio stream, in portions, with intervals between each portion. During each interval, no data is output by buffer 118 or buffer 123. Buffers 118 and 123 may be synchronized so as to output data during simultaneous portions, and not to output data during simultaneous intervals.

Service multiplex 145 also receives control data and ancillary data, as illustrated. Control data may include conditional access control data, for example. Ancillary data may include independent program services, and data associated with program audio and video services, such as closed captioning. Service multiplex also receives first audio and video timing information 130, which provides information related to timing of the output of data from buffers 118, 123.

Service multiplex 145 multiplexes the received data, including the encoded and compressed audio and video streams, control data, ancillary data, and first audio and video timing information. Transport 147 provides a transport mechanism. By way of example, service multiplex 145 and transport 147 may employ the MPEG-2 transport stream syntax for the packetization and multiplexing of video, audio and data signals. Transport 147 provides the packetized and multiplexed data stream, including video, audio and data signals, to RF/Transmission system 150, and particularly to channel coder 152. Channel coder 152 may add additional information usable by receivers to reconstruct the data from the received signal in the event of transmission problems or impairments. Channel coder 152 outputs the packetized and multiplexed data stream, with additional information added by channel coder 152, to modulator 154. Modulator 154 modulates the data stream. Modulator 154 may modulate using the terrestrial broadcast mode, 8-VSB (vestigial sideband), or a high data rate broadcast mode, such as 16-VSB. Modulator 154 provides the modulated data stream to wireless transmitter 156, which wirelessly transmits the modulated data stream.

Receivers 160, 162 are illustrated. Receiver 160 may be a fixed receiver, such as a digital television set having direct connection to an external power source, such as a source of household current. Receiver 160 may not be adapted for operation except when connected to a source of household current. Receiver 162 may be a portable device, and may be a portable handheld device. Receiver 162 may include a housing having therein a source of power, such as one or more batteries, which may be rechargeable batteries. Receiver 162 may include a display and one or more speakers for audio output. Receiver 162 may include other functionality, and may include, by way of example, a personal digital assistant, as illustrated, a cell or satellite phone, a satellite or terrestrial radio receiver, a digital music player, a personal computer, and devices incorporating the functions of any two or more of the foregoing. Receiver 162 may include any other functionality desirable in a portable device.

Modulator 154 also provides modulation data to transport control 125. Transport control 125 controls the service multiplexer 145, controlling the timing of data from buffers 118 and 123, and providing synchronization to first audio and video timing information block 130, which generates timing control packets to synchronize the burst reception process in the receiver.

In the implementation shown in FIG. 1, the first data stream is transmitted in portions separated by intervals that are of sufficient duration for a receiver to enter a power saving mode and exit a power saving mode during the intervals. The second data stream is transmitted continuously, without intervals of sufficient duration for a receiver to enter a power saving mode and exit a power saving mode during the intervals. The first data stream may be transmitted in a burst mode. The second data stream may be transmitted in a continuous mode. Both data streams may be transmitted according to a protocol that expects a receiver to be on at all times.

Various implementations define an active period of time in which a receiver is not in a power saving mode, and a power-saving period of time in which a receiver is in the power saving mode. These periods of time may be fixed. These periods of time may be defined, or at least substantially determined, by the times at which a receiver enters and exits the power saving mode. During the active period of time, a receiver performs acquisition and receives data.

Figure 2:
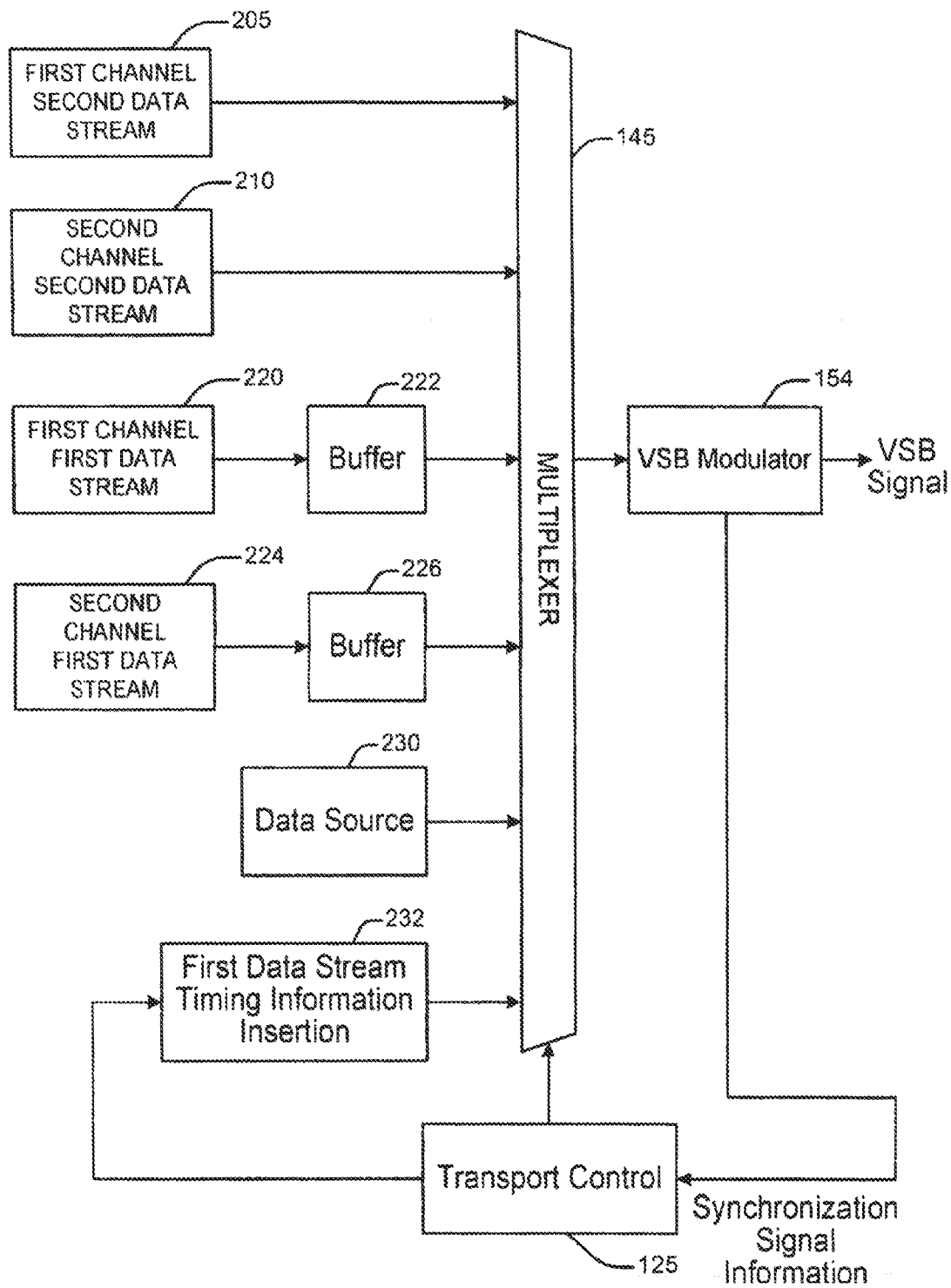
FIG. 2 is a schematic illustration of an embodiment of a transmitter.

Referring now to FIG. 2, an implementation of a transmitter 200 will be discussed. The transmitter may be implemented in system 100 of FIG. 1, for example. A first channel of a second data stream 205, which may be suitably encoded and compressed as discussed above, is provided to multiplexer 145. A second channel of a second data stream 210, which may be suitably encoded and compressed as discussed above, is also provided to multiplexer 145. Providing of first and second channels of the second data stream may be substantially continuous. The first and second channels may be first and second channels of a digital television broadcast, and may include video, audio and ancillary data. A first channel of a first data stream 220 may be provided to buffer 222. A second channel of a first data stream 224 may be provided to buffer 226. Buffer 222 and buffer 226 may each include separate buffers for a video data stream and an audio data stream. The first and second channels may be first and second channels of digital television broadcast, which may include a lower data transfer rate for a given period of programming than the second data stream.

Buffers 222, 226, are associated with first channel 220, and second channel 224, respectively. Buffer 222 receives first channel data 220 substantially continuously, and substantially at a playback rate associated with first channel data 220. Buffer 222 stores received first channel data, and outputs first channel data to multiplexer 145 at a rate higher than the playback rate associated with first channel data 220, with intervals separating the output of first channel data to multiplexer 145. The average rate of data output by buffer 222, including both intervals and time periods during which data is output, is the same as the rate of data received from first channel 220. Similarly, buffer 226 stores received second channel data and outputs stored second channel data to multiplexer 145 at a rate higher than the playback rate associated with second channel data 224. The average rate of data output by buffer 226, including both intervals and time periods during which data is output, is the same as the rate of data received from second channel 224. In an embodiment, there may be more than two channels, similar to channels 220, 224, and a buffer associated with each channel. Alternatively, a buffer may be associated with more than one channel.

Data source 230 may provide ancillary data and control data, as noted above. First data stream timing information insertion 232 provides data concerning the timing of the output of first data stream data from buffers 222, 226. The first data stream timing information insertion packet, or packets, provide the current state of the transmitter counter, and when the various burst transmissions will be sent relative to the transmitter counter. The first data stream timing information is explained below in greater detail. Multiplexer 145 receives and multiplexes and packetizes data, including the channels of the first data stream and the channels of the second data stream, control data and ancillary data from data source 230, and first data stream timing information insertion 232, using, for example, the MPEG-2 data transport standard. The multiplexed data is provided to VSB modulator 154, which outputs a VSB modulated signal, which is then provided to a wireless transmitter (not shown). Synchronization signal information from the VSB modulator 154 may be provided to transport control 125. Transport control 125 provides timing control signals to multiplexer 145 to control the output of multiplexed data from multiplexer 145. Transport control 145 also provides timing information to first data stream timing information insertion 232.

Figure 3:
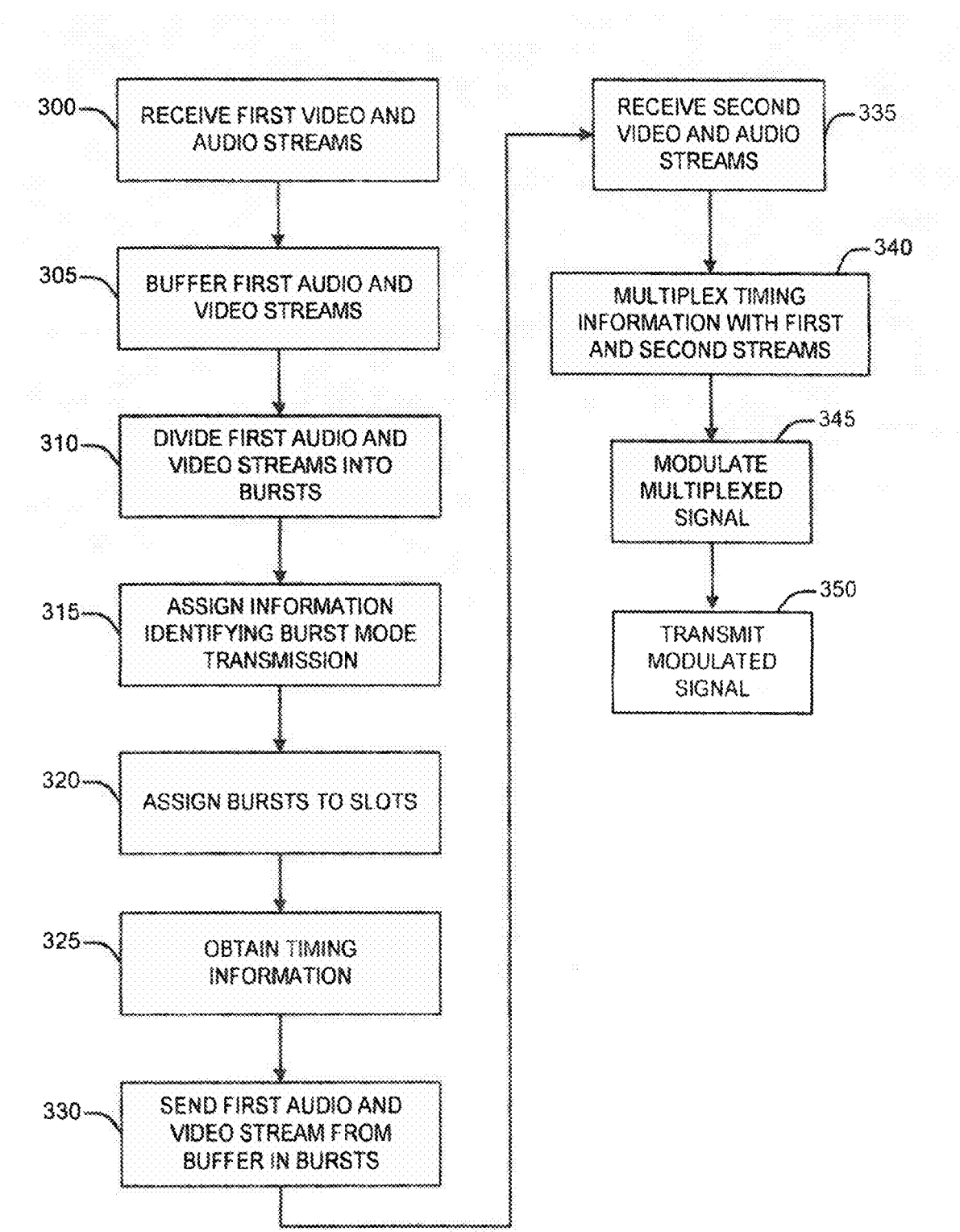
FIG. 3 is a process flow diagram of an embodiment of a method of transmission.

Referring now to FIG. 3, a process flow in an implementation, such as the transmitter of FIG. 2, will be explained. First video and audio streams are received, as indicated by block 300. The first video and audio streams may constitute digital television channels, or other sources of data. The received first audio and video streams are buffered, as indicated by block 305. For example, buffering may be performed by buffers 222, 226 of FIG. 2. The first audio and video streams are divided into bursts, as indicated by block 310. The burst size may be defined by numbers of data fields, for example. As indicated by block 325, tags identifying the bursts as relating to burst mode transmission may be assigned to the fields that will be transmitted by burst mode transmission. The bursts may be assigned to slots in a transmission channel, as indicated by block 320. Further explanation of the assignment of bursts to slots is discussed below with reference to FIG. 5. The timing information for outputting of bursts from the buffers is obtained by the buffers, as indicated by block 325. The timing information may be determined based on a timing pulse that is also included in the transmitted data. The bursts are assigned to slots in a transmission channel, as indicated by block 320. The first audio and video stream is sent from a buffer in bursts, as indicated by block 330. The timing is in accordance with the timing information obtained at block 325, and the bursts may be assigned to slots in accordance with block 320.

The second video and audio streams are received by a multiplexer, as indicated at block 335. The multiplexer then multiplexes the timing information with the first and second streams, as indicated by block 340. As discussed in greater detail above, the stream, timing and other data, such as ancillary and control data, may be multiplexed in accordance with a standard such as the MPEG-2 transport standard. The multiplexed stream is then modulated, such as in accordance with a VSB modulation standard, as indicated by block 345. The modulated signal is then wirelessly transmitted, as indicated by block 350.

Figure 4:
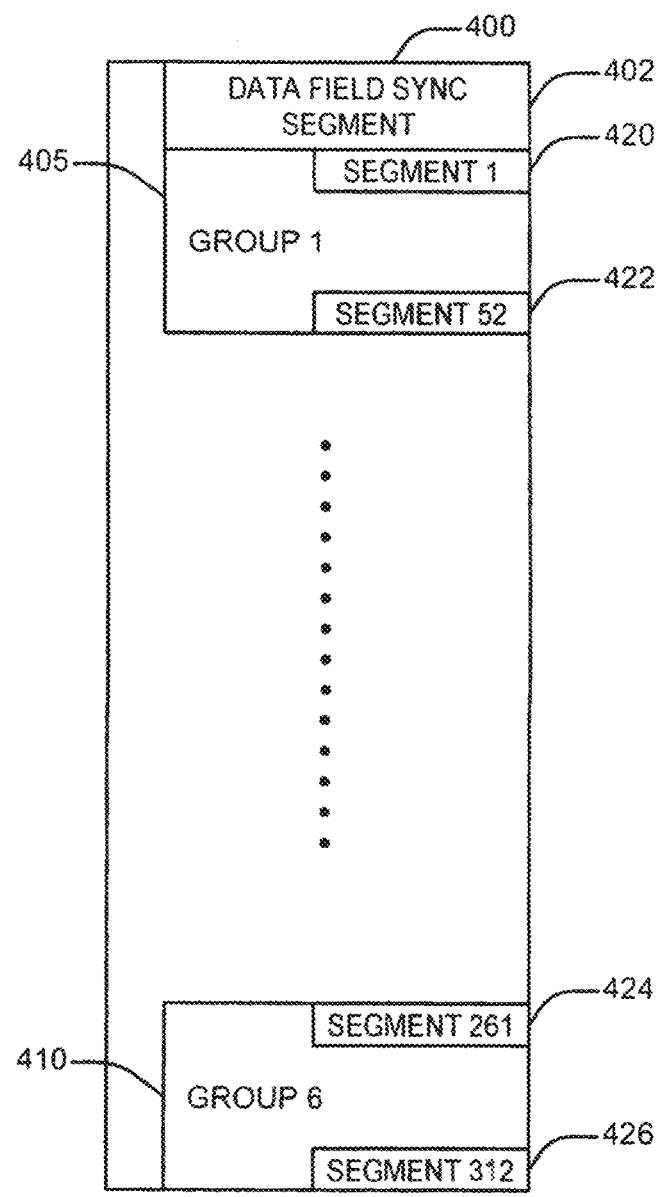
FIG. 4 shows components of an exemplary field of data ready for transmission in an embodiment.

Referring now to FIG. 4, an exemplary field of data 400 ready for transmission in an embodiment is shown. The format is in accordance with the A/53 Digital Television Standard. Field 400 is divided into 313 segments. The first segment is data field sync segment 402. This segment contains data usable by a receiver to synchronize with the transmission. The remaining 312 segments are grouped in six groups, Group 1 405, through Group 6 410. Each group includes 52 segments, such as Segment 1 420 through Segment 52 422 of Group 1, and segment 261 424 through segment 312 426 of Group 6. Data fields contain data identifying them as being either associated with a first data stream, which is of interest to a demodulator in a portable device, or associated with a second data stream, which is of interest to a digital television. In one implementation, the stream identification data is included in the headers of the data packets.

It will be appreciated that data is formatted in field 400 as part of a larger process of providing forward error correction techniques and data formatting. For example, such known techniques as data randomization, Reed Solomon encoding, interleaving, trellis encoding, synchronization, and pilot insertion may be provided prior to forwarding the data to the VSB modulator.

Figure 5A:
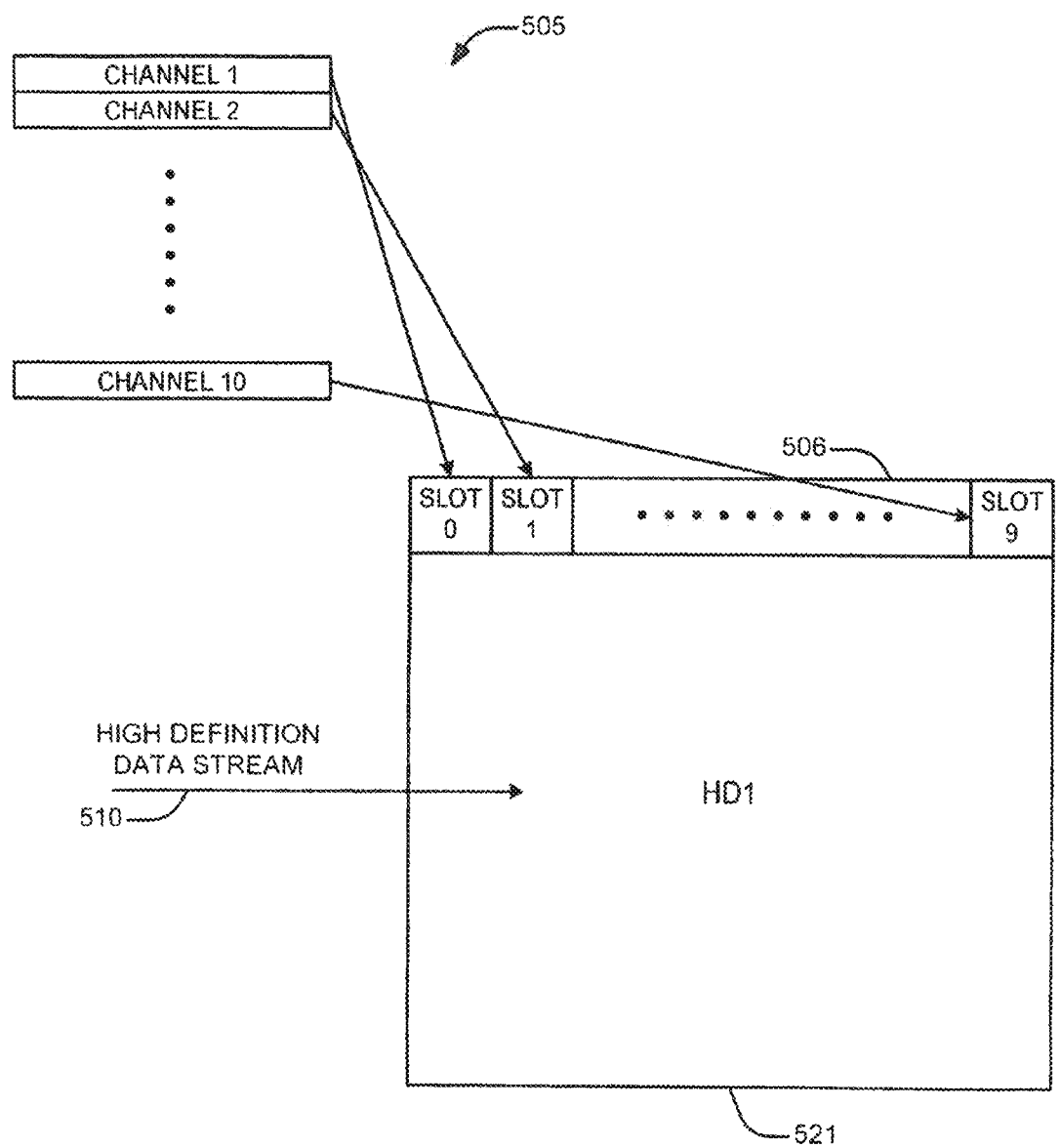
FIG. 5A shows exemplary assignment of slots and relative use of bandwidth in a method of transmission.

Referring now to FIG. 5A, exemplary assignment of channels to slots in an implementation is shown. There are represented generally at 505 incoming data streams for 10 channels of programming particularly intended for transmission in a manner that permits a receiver to regularly enter and exit a power saving mode, while still receiving continuous programming for a selected channel. There is represented generally at 510 an incoming data stream for channel capacity intended for use by digital television receivers. Block 506 generally represents the incoming data streams 505 as formatted for transmission. The channels 505 have been arranged sequentially, each representing a burst from a separate buffer associated with the channel. The vertical height of block 506 generally represents bandwidth, while the horizontal width represents time. It can be seen that the 10 channels at 505 represent a relatively small portion of the total bandwidth. The high definition data stream 510 is not allocated in slots and fills the remaining bandwidth without regard to timing, as indicated at 521.

Figure 5B:
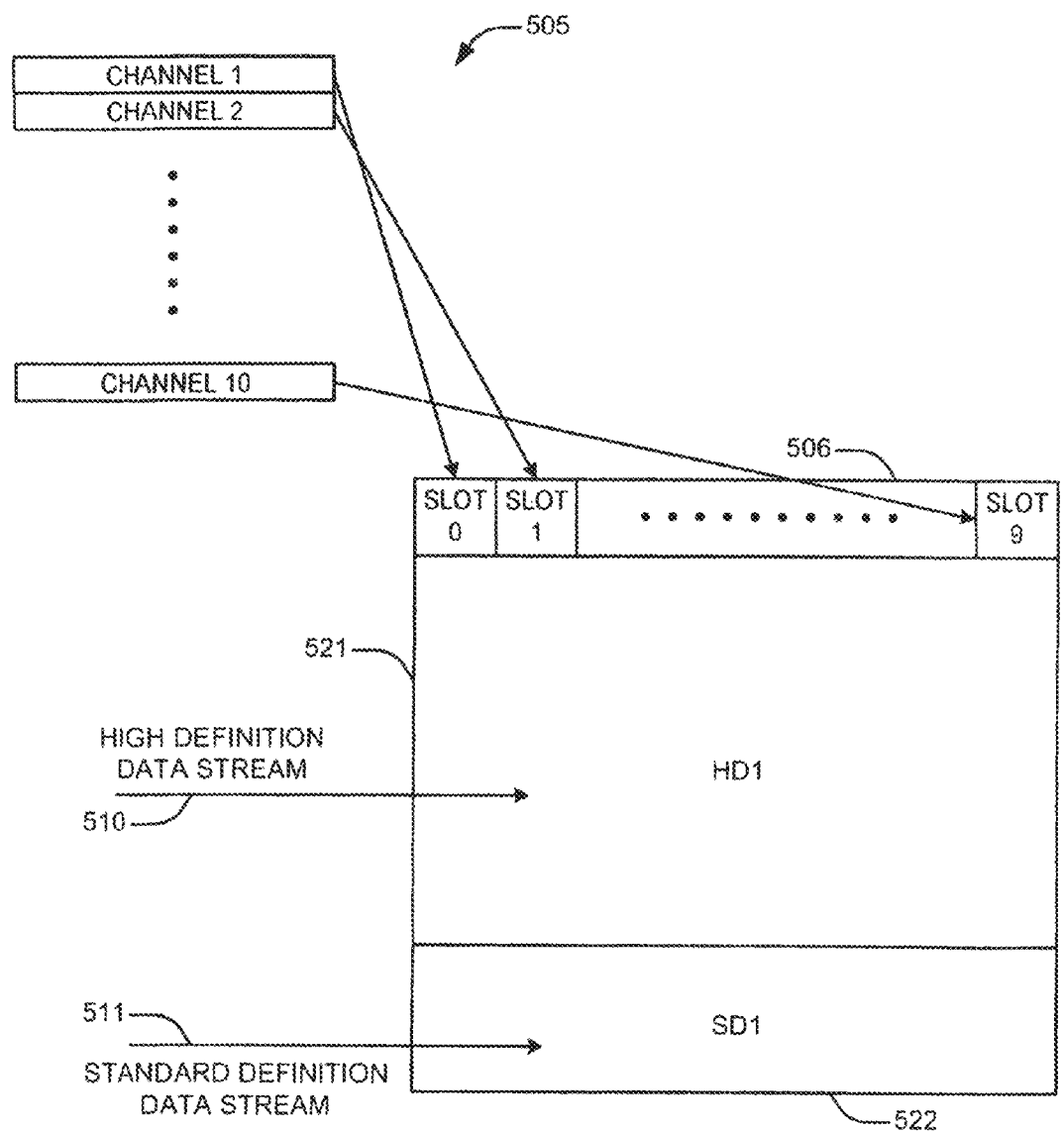
FIG. 5B shows exemplary assignment of slots and relative use of bandwidth in a method of transmission including both high definition and standard definition data.

Referring now to FIG. 5B, exemplary allocation of slots and division of bandwidth in an implementation including both high definition television data and standard definition television (SDTV) data is shown. Channels 505 are arranged sequentially, in the same manner as in FIG. 5A. A standard terrestrial HDTV data stream 510 occupies a major portion, which may be the majority, of the bandwidth, as indicated at 521. A standard definition television data stream 511 occupies a further portion of the bandwidth, as indicated at 522.

Figure 5C:
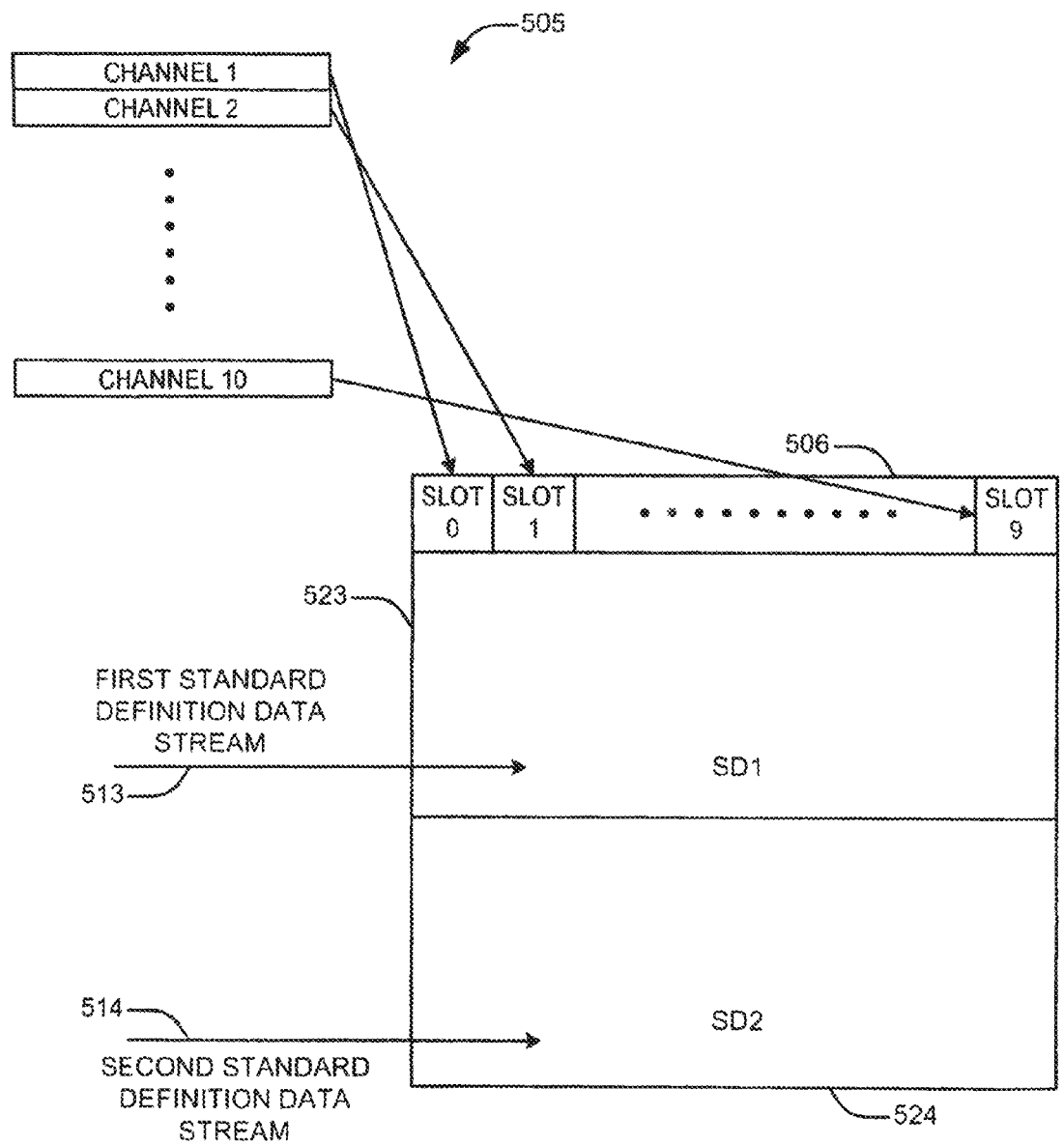
FIG. 5C shows exemplary assignment of slots and relative use of bandwidth in a method of transmission including two streams of standard definition data.

Referring now to FIG. 5C, exemplary allocation of slots and division of bandwidth in an implementation including two streams of standard definition television data is shown. Channels 505 are arranged sequentially, in the same manner, in the same manner as in FIGS. 5A and 5B. A first standard definition television data stream 513 occupies a portion of the bandwidth, as indicated at 523. A second standard definition data stream 514 occupies the remaining bandwidth, as indicated at 524. FIGS. 5A, 5B, and 5C may illustrate bandwidth relationships between, for example, mobile programming (for example, channels 505) and standard terrestrial (for example, HDTV 521 and SDTV 522) programming.

Figure 6:
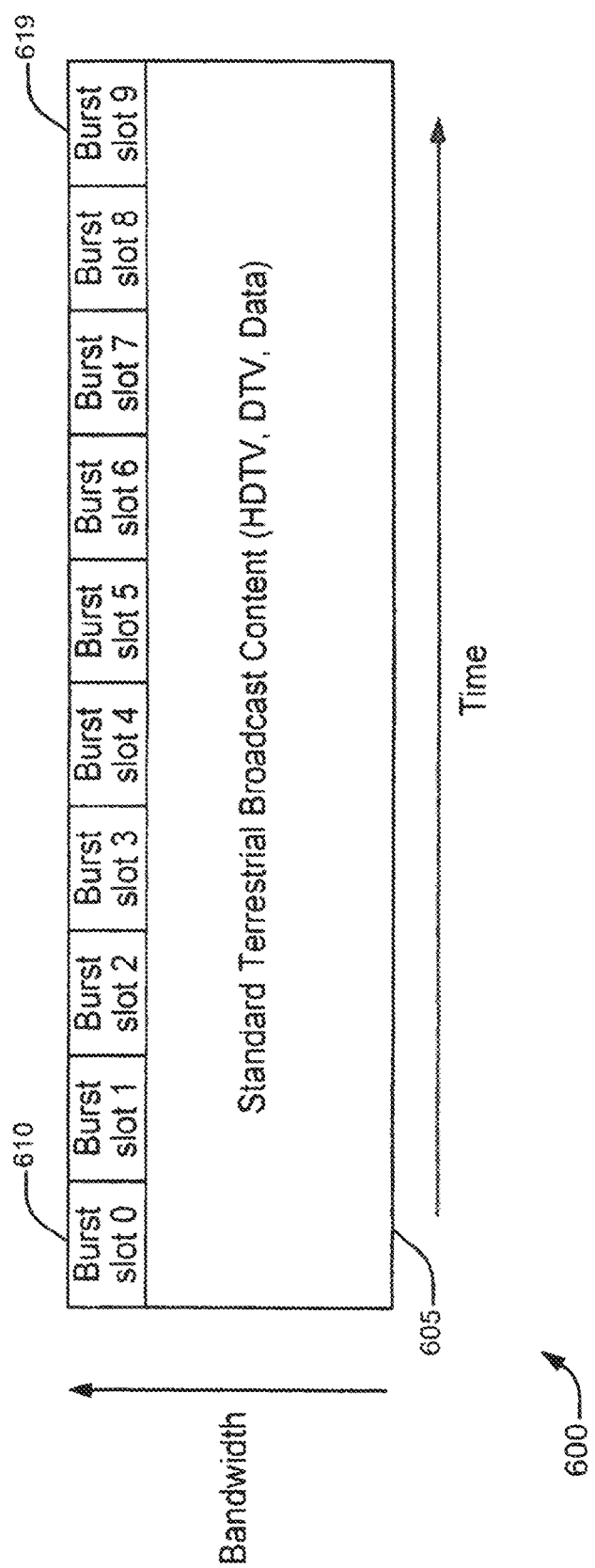
FIG. 6 illustrates utilization of bandwidth in an embodiment.

Referring now to FIG. 6, the division of bandwidth between data streams for mobile receiver use, and standard terrestrial broadcast, is shown. Block 600 represents the use of bandwidth over a selected period of time. Blocks 610, 619, and intermediate blocks, each represent burst slots. Burst slot 0 may represent, for example, a burst made up of data representing a data stream for a time period equal to the entire width of block 600, even though the data is transmitted in a burst only one-tenth the overall time period. Block 605 represents the bandwidth of continuous mode terrestrial broadcast content, such as that associated with high definition television, digital television, and other data. It will be appreciated that the numbers of slots is merely exemplary.

The amount of data per unit time per channel for the data transmitted in a burst mode may be less than the amount of data per unit time per channel for the data transmitted in a continuous mode. Indeed, the burst mode channels typically have a much lower data rate. For example, a burst mode channel may be in the range of 100-400 kbps, and a continuous-mode channel may be in the range of 10-12 Mbps. Accordingly, multiple burst mode channels may be accommodated in the same amount of bandwidth as a single continuous mode channel.

Figure 7:
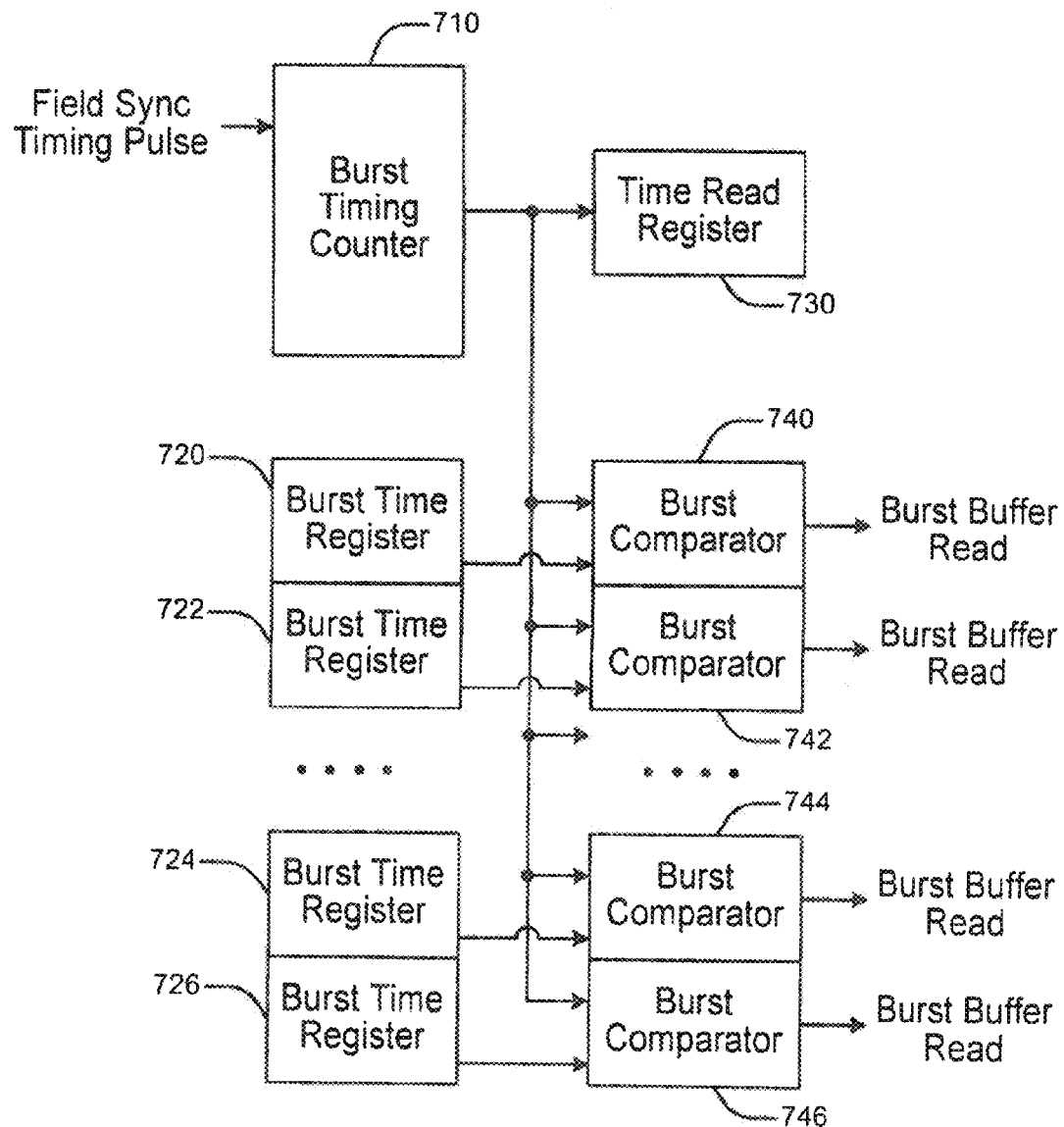
FIG. 7 illustrates an implementation of control for timing of reading of burst buffers in an embodiment.

Referring now to FIG. 7, an exemplary implementation of control for timing of reading of burst buffers will be explained. A field synchronization timing pulse, which may be received from a modulator, is received at burst timing counter 710. Burst timing counter 710 outputs a value of the elapsed time in field sync periods based on the field sync timing pulse or a locally generated equivalent clock when in power saving mode. The burst timing counter is locked to the transmitter by timing information packets generated by first data stream timing information insertion block 232. In power saving mode, a timing pulse equivalent to the field sync pulse is locally generated. The clock signal is output to time read register 730. The time measured in field sync periods for reading of each burst buffer is stored in a corresponding burst time register 720, 722, 724, 726. Each burst time register provides the stored relative time to a corresponding burst comparator 740, 742, 744, 746. Burst comparators 740, 742, 744, 746 also receive the signal from the burst timing counter 710, and compare the value of the signal from the burst timing counter to the value received from the burst time register. When the signal from the burst timing counter indicates a time equal to the value received from the burst time register, the burst comparator outputs a burst buffer read signal. The field sync serves as a clock signal, and the field sync period may serve as the time base for the slots to which data is assigned, as explained above in connection with FIGS.

5A-5C. Both the transmitter and receiver have counters which count in units equal to the field sync period. First data stream timing information insertion 232 sends a packet that tells when to synchronize the burst timing counter, and the burst timing counter will determine time based on intervals equal to the interval between field syncs. The timing information packets generated by first data stream timing information insertion 232 must be periodically transmitted so that the receivers will be able to become synchronized after a power-up or an RF channel change. Field sync is an exemplary available time base for synchronizing, and alternative time bases could be employed.

Implementations may include information about when to wake up, or when a next burst will be sent for a given channel, by, for example, (1) using periodic timing in which, for example, every ten seconds bursts are sent, (2) including the information inside of a mobile packet, such as, for example, an MPEG control packet, or (3) including the information in a field sync segment.

Figure 8:
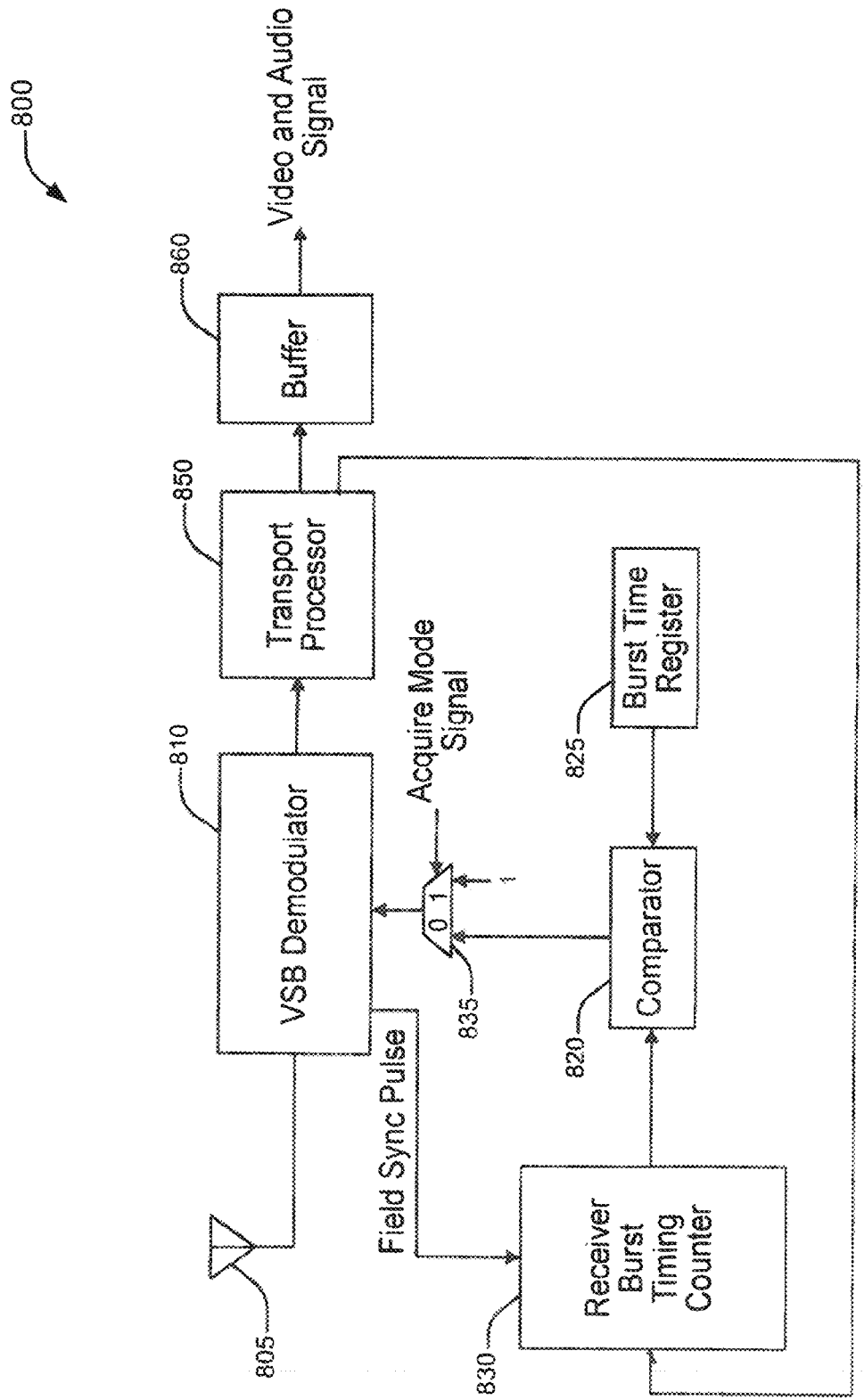
FIG. 8 is a block diagram of a receiver in an embodiment.

Referring now to FIG. 8, an embodiment of a receiver 800 will be explained. Receiver 800 may be, by way of example, a portable handheld device. The modulated signal is received at antenna 805 and provided to VSB demodulator 810. VSB demodulator 810 demodulates the received signal, and may also select the signal components relevant to the receiver (for example, the video for a selected channel).

VSB demodulator 810 identifies the field sync pulse signal, and outputs the field sync pulse signal to the receiver burst timing counter. The output is provided to transport processor 850, which then performs data recovery functions on the signal, and outputs the audio and video signal to buffer 860. Transport processor 850 also identifies the time of next transmission of a burst of interest, and provides information to synchronize receiver burst timing counter 830 to the burst sequence at the transmitter. The time of next transmission may be, for example, provided in the received stream, provided in other control information that is received, or provided in a published guide.

The receiver burst timing counter 830 counts intervals equal to the interval between field syncs from the receipt of timing information from first data stream timing information insertion 232 (shown in FIG. 2), maintaining a count related to the slot sequencing in the transmitter. This counter may be implemented as a cyclic count matching the slot sequencing of the system. Burst timing counter 830 provides a signal indicating the time elapsed following the receipt of the timing information from first data stream timing information insertion 232 to comparator 820. Burst time register 825 stores values which correspond to the time period when the burst is to be received, and provides this time to comparator 820. The values to be stored are obtained from a packet containing a mobile program guide, provided by the transmitter. Comparator 820 generates a signal when the inputs match to turn on (wake-up) VSB demodulator 810. Acquire mode multiplexer 835 provides a signal to turn on (wake up) VSB demodulator 810 when the comparator 820 inputs match or when the receiver 800 is in acquire mode (indicated by an acquire mode signal).

Figure 9:
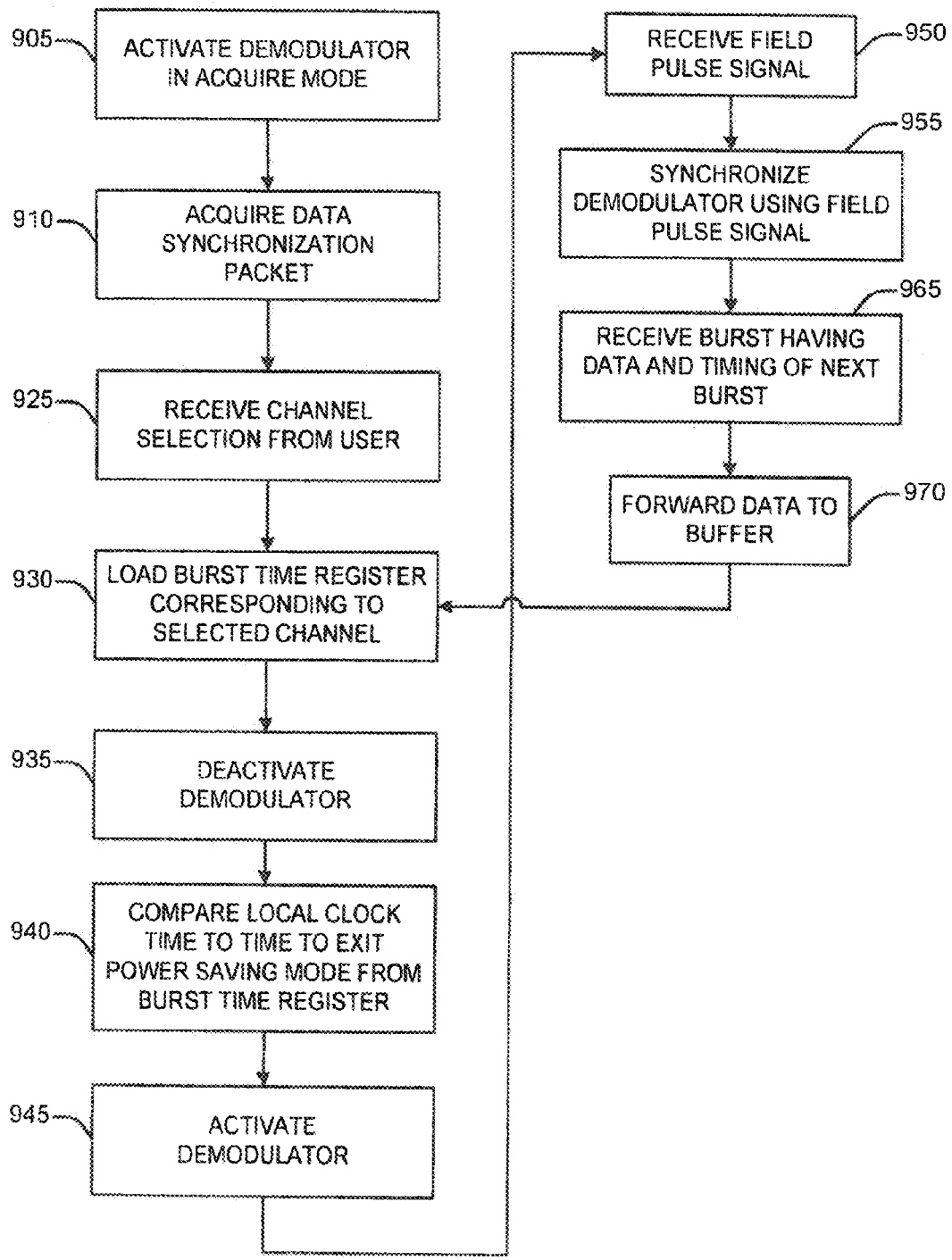
FIG. 9 is a process flow diagram of an embodiment of a method of receiving data.

Referring now to FIG. 9, an embodiment of a process of receiving data will be explained. The process may be performed, for example, by the receiver illustrated in FIG. 8. Prior to the step indicated by block 905, the receiver may be in a power saving mode. In the power saving mode, the demodulator 810 may not be operating. In an initial step, the demodulator is activated in an acquire mode, as indicated by block 905. In the acquire mode, the demodulator is seeking to identify a data synchronization packet. In the next step, the data synchronization packet is acquired, as indicated by block 910. Once synchronization has been achieved, a signal can be received.

The receiver may receive and demodulate information such as program guide information, which may be displayed for a user. A user may then input a selection of a user-determined data object, which may be a stream of data representing audio and video in one television channel. The channel selection is received from the user, as indicated by block 925. The demodulator then obtains the time of the next burst transmission corresponding to the selected channel, which is loaded into the burst time register, as indicated by block 930. The receiver may then enter a power saving mode. The step of entering the power saving mode may include the step of deactivating the demodulator, as indicated by block 935. Some implementations will wait for the next burst for the selected channel before determining a "next" transmission time and entering a power-saving mode.

The receiver includes a local clock, and the time maintained by the local clock is compared to the time of the next burst or packet of interest from the burst time register, as indicated by block 940. It will be appreciated that the time stored in the burst time register may be an appropriate time in advance of the time of the next burst expected for the selected channel for the receiver to exit the power saving mode. For example, the time stored may be sufficient for one or more fields of data to be processed before the expected time of the next burst corresponding to the selected channel. One implementation exits power-saving mode several fields in advance of a burst to allow the demodulator to acquire the signal.

When the local time reaches the time from the burst time register to exit the power saving mode, then the receiver exits the power saving mode. The step of exiting the power saving mode may include activating the demodulator, as indicated by block 945. The demodulator receives the field pulse signal, as indicated by block 950. The demodulator is synchronized using the field pulse signal, as indicated by block 955. The burst, which includes data, such as television data, and the timing of the next burst, is then received, as indicated by block 965.

The data, such as video and audio data, is then forwarded to a buffer, as indicated by block 970. The process flow then returns to loading the burst time register corresponding to the selected channel, as indicated by the line leading from block 970 to block 930. The receiver then enters a power saving mode again, by deactivating the demodulator.

Figure 10:
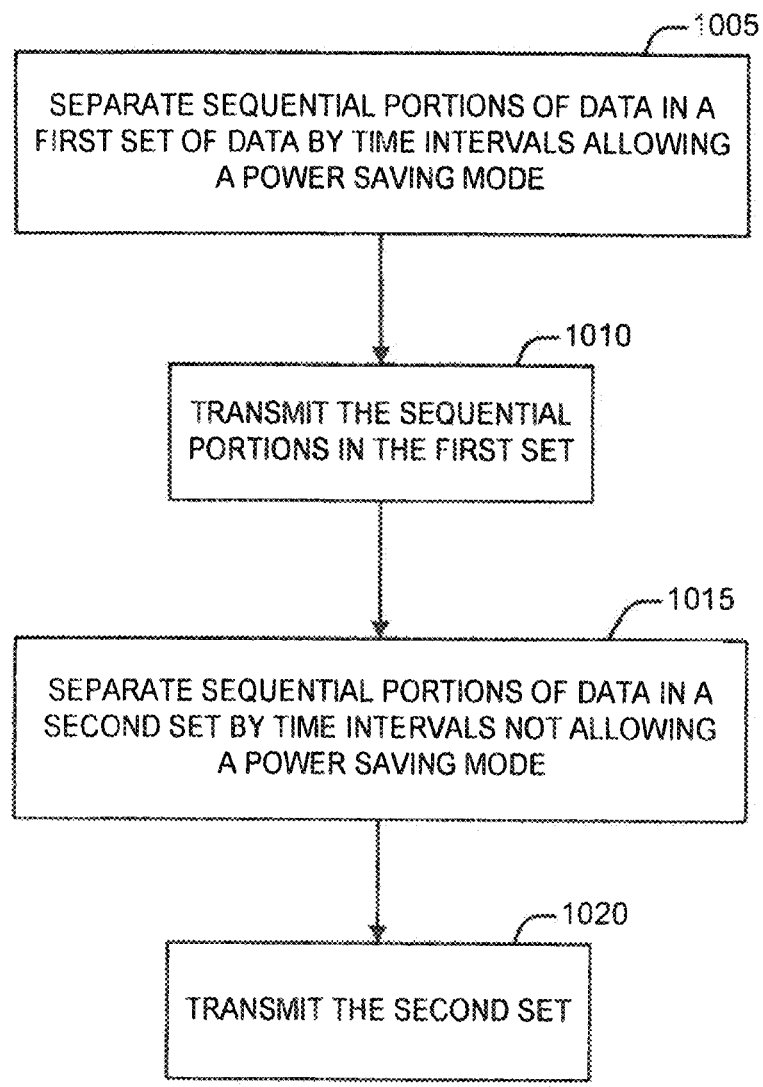
FIG. 10 is a process flow diagram of an embodiment of a method of transmitting data.

According to an implementation, and referring to FIG. 10, a method includes transmitting, from a transmitter, a first set of data. The transmissions of sequential portions of data constituting the first set of data are separated by respective time intervals having lengths configured to allow a receiver to enter a power saving mode and then exit the power saving mode between receiving sequentially transmitted portions of data from the first set of data, as indicated by block 1005. The transmitter transmits the sequential portions of data from the first set of data, as indicated by block 1010. A second set of data, as indicated by block 1015, has sequential portions separated by respective time intervals having lengths that are not configured to allow a receiver to enter the power saving mode and then to exit the power saving mode between receiving sequentially transmitted portions from the second set of data. The sequential portions of the second set of data are transmitted, as indicated by block 1020. A set of data is data selectable by a user, such as, for example, by allowing the user to select from a display of the programming on the received RF channel or from a general electronic program guide.

Implementations may transmit all sequential portions of the first set of data with time intervals allowing the above power saving mode, and may transmit all sequential portions of the second set of data with time intervals not allowing the above power saving mode. Other implementations may transmit the data constituting the first set of data with time intervals allowing the above power saving mode, and may transmit the data constituting the second set of data with time intervals not allowing the above power saving mode. The data that constitutes a set of data is all or substantially all of the data that defines the set of data. For example, if the set of data is a television program, the data constituting the set of data is at least substantially all of the data transmitted to provide the program on a receiver.

In an implementation, the receiver enters the power saving mode by turning off. Other implementations enter a power saving mode by turning off (or merely entering a power saving state in) one or more components, such as, for example, a demodulator.

Figure 11:
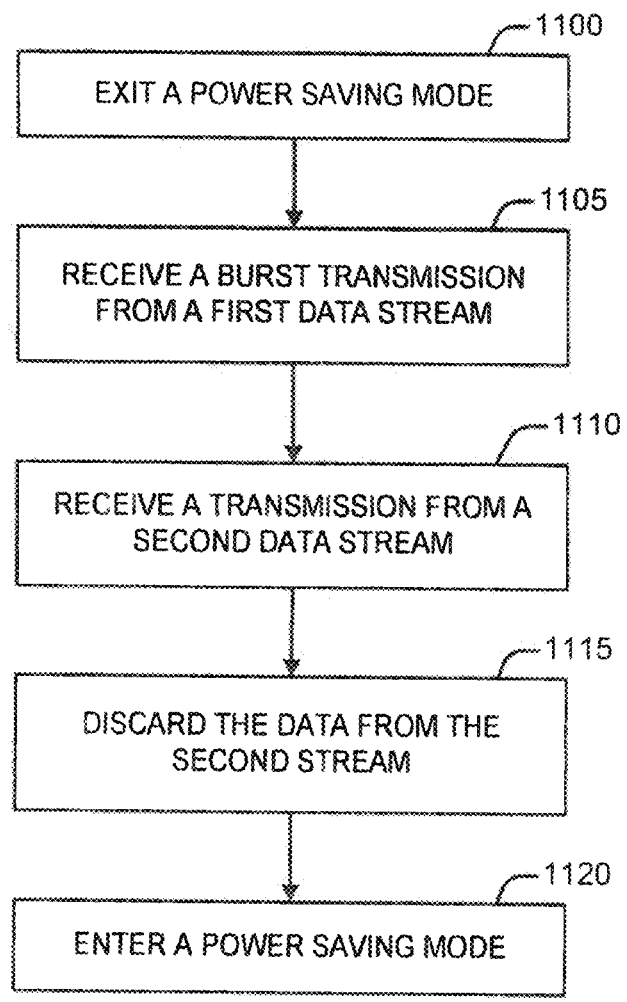
FIG. 11 is a process flow diagram of an embodiment of a method of receiving data.

Referring to FIG. 11, in an implementation, a receiver exits a power saving mode, as indicated by block 1100. The receiver receives a burst transmission from a first stream of data, as indicated by block 1105. The receiver receives a transmission from a second data stream, as indicated by block 1110. The receiver discards the data received from the second data stream, as indicated by block 1115. The receiver then enters the power saving mode, as indicated by block 1120. The time period between exiting the power saving mode and entering the power saving mode may be referred to as an active time period.

In one implementation, the second data stream is a burst program that is not of interest. In another implementation, a mobile device is only interested in receiving burst programs, and the second data stream is a television (high definition or standard definition, for example) program that is not transmitted in burst mode. In another implementation, no second stream is received during the active time period because the timing of exiting and entering the power saving mode is such that, after exiting the power saving mode and performing acquisition, only the first stream is received before entering the power saving mode.

Figure 12:
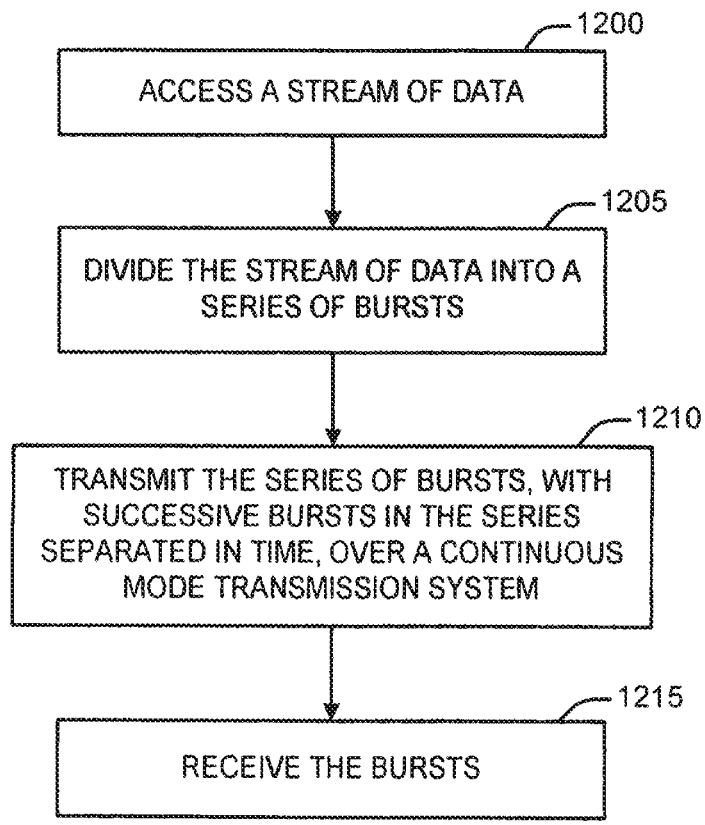
FIG. 12 is a process flow diagram of an embodiment of a method of transmitting data.

Referring to FIG. 12, steps performed by a transmitter and steps performed by a receiver are shown, although these steps may be implemented separately. A transmitter accesses a stream of data, as indicated by block 1200. The stream of data is divided into a series of bursts, as indicated by block 1205. The series of bursts is transmitted with successive bursts in the series separated in time, over a continuous-mode transmission system, as indicated by block 1210. A receiver receives the transmitted bursts, as indicated by block 1215.

Various implementations provide backward compatibility for legacy receivers that implement the ATSC A/53 standard. In one such implementation, backward compatibility is provided by the fact that the receivers will discard any data received for a burst channel. The receivers will discard the burst data because the receivers will not recognize the channel identifier. Non-recognition occurs because identifiers for the burst channels will not be included in the channel map information provided by the broadcaster.

As described throughout this application, one implementation allows for low data-rate information to be burst-transmitted and burst-received on mobile devices. Such an implementation allows, for example, a user to view compressed video on a cell phone. The burst nature of the transmission and reception allows the cell phone to use power-saving modes between bursts to conserve power. Additionally, the burst data may be broadcast multiple times in a staggercast manner to allow a receiver a second (or higher) opportunity to receive the burst data.

Implementations have been described that allow burst data to be transmuted to receivers that implement the ATSC A/53 standard. The ATSC A/53 standard is commonly referred to as a continuous standard, and ATSC A/53-compliant receivers are commonly referred to as continuous receivers, because the data for any given channel can be transmitted continuously and would need to be received continuously. That is, there is no burst provision built into the ATSC A/53 standard. In a similar manner, other implementations provide burst capability for different continuous standards and systems.

Providing a burst mode in conjunction with the ATSC A/53 standard addresses various technical problems facing broadcasters of content that broadcast using the ATSC A/53 standard. Such problems include, for example, the high-power requirements for mobile devices, and the lack of large bandwidth for additional programming. The burst mode provides a technical solution by integrating burst characteristics and timing considerations into the ATSC A/53 transmission, as well as multiplexing the burst data with the continuous data. The technical advantages include increased programming for mobile devices, lower power requirements for mobile devices, and compatibility with existing broadcasts of ATSC N53 programming.

Further, various of the solutions described in this application advance the ATSC N53 standard in non-obvious ways by, for example, requiring additional bandwidth on an already constrained physical channel (for example, constrained to 6 MHz for a broadcaster), transmitting burst data over a continuous-standard system, and requiring additional storage for bursts at transmitter and receiver. Further, receivers that take advantage of the burst nature and enter and exit a power saving mode between bursts will lose lock with any continuous-mode channels that are being received, and will also have to accommodate the relatively large acquire time that is required when exiting the burst mode.

The term playback rate typically refers to the bit rate at which data is played back. Thus, if a burst contains data to be played back until the next burst occurs, then the burst will generally be transmitting data a higher rate than the playback rate. The transmit rate typically refers to the average transmission rate during the time of transmission, although an instantaneous rate may also be used.

The various aspects, implementations, and features may be implemented in one or more of a variety of manners, even if described above without reference to a particular manner or using only one manner. For example, the various aspects, implementations, and features may be implemented using, for example, one or more of a method, an apparatus, an apparatus or processing device for performing a method, a program or other set of instructions, an apparatus that includes a program or a set of instructions, and a computer readable medium.

An apparatus may include, for example, discrete or integrated hardware, firmware, and software. As an example, an apparatus may include, for example, a processor, which refers to processing devices in general, including, for example, a microprocessor, an integrated circuit, or a programmable logic device. As another example, an apparatus may include one or more computer readable media having instructions for carrying out one or more processes.

A computer readable medium may include, for example, a software carrier or other storage device such as, for example, a hard disk, a compact diskette, a random access memory ("RAM"), or a read-only memory ("ROM"). A computer readable medium also may include, for example, formatted electromagnetic waves encoding or transmitting instructions. Instructions may be, for example, in hardware, firmware, software, or in an electromagnetic wave. Instructions may be found in, for example, an operating system, a separate application, or a combination of the two. A processor may be characterized, therefore, as, for example, both a device configured to carry out a process and a device that includes a computer readable medium having instructions for carrying out a process.

A number of implementations have been described. Nevertheless, it will be understood that various modifications may be made. For example, elements of different implementations may be combined, supplemented, modified, or removed to produce other implementations. Accordingly, other implementations are within the scope of the following claims.

The invention claimed is:

1. A method for receiving data comprising:
exiting a power saving mode at least two times for corresponding fixed and periodic active periods of time at a receiver in order to receive a separate burst transmission from a first stream during each of the corresponding active periods of time, the active periods of time having a first common length of time determined prior to a first of the active periods of time;
receiving, during the active periods of time, the burst transmissions from the first stream at the receiver, the burst transmissions being received over a continuous-mode transmission system, wherein the first stream is received by the receiver at a first-stream burst data rate, and the first stream includes data configured to be displayed at a first playback rate that is substantially less than the first-stream burst data rate;
receiving, during the active periods of time, data from a second stream at the receiver, the data from the second stream being received over the continuous-mode transmission system, wherein the second stream is received by the receiver at a second-stream rate, and the second stream includes data configured to be displayed at a second playback rate that is substantially the same as the second-stream rate;
discarding the data received from the second stream; and
after receiving each of the burst transmissions from the first stream during the at least two active periods of time, entering the power saving mode for corresponding fixed and periodic power-saving periods of time while waiting for another burst from the first stream, the power-saving periods of time having a second common length of time determined prior to a first of the active periods of time.

2. The method of claim 1 wherein said exiting of the power saving mode comprises exiting at a time that is based on an expected arrival time of the burst transmission.

3. The method of claim 1, further comprising determining that the received data from the second stream does not belong to a stream of data that is of interest.

4. The method of claim 1, wherein said receiver is a receiver of a portable playback device.

5. The method of claim 1, wherein said method provides reduced power consumption compared to operating said receiver continuously.

6. The method of claim 1 wherein:
said data received from said second stream is from a transmission that uses the ATSC N53 Digital Television Standard, so as to enable an A/53 compatible receiver to display said data received from said second stream, and said burst transmission from said first stream is compatible with the ATSC A/53 Digital Television Standard.

7. The method of claim 1, wherein:
the burst transmission from the first stream is received at the receiver over the continuous-mode transmission system in a vestigial side-band modulation format, and
the data from the second stream is received at the receiver over the continuous-mode transmission system in the vestigial side-band modulation format.

8. The method of claim 1, wherein the burst transmissions use a data structure that includes a synchronization segment containing data usable by a receiver to synchronize with the burst transmissions.

9. An apparatus for receiving data comprising:
means for exiting a power saving mode at least two times for corresponding fixed and periodic active periods of time at a receiver in order to receive a separate burst transmission from a first stream during each of the corresponding active periods of time, the active periods of time having a first common length of time determined prior to a first of the active periods of time;
means for receiving, during the active periods of time, the burst transmissions from the first stream at the receiver, the burst transmissions being received over a continuous-mode transmission system, wherein the first stream is received by the receiver at a first-stream burst data rate, and the first stream includes data configured to be displayed at a first playback rate that is substantially less than the first-stream burst data rate;
means for receiving, during the active periods of time, data from a second stream at the receiver, the data from the second stream being received over the continuous-mode transmission system, wherein the second stream is received by the receiver at a second-stream rate, and the second stream includes data configured to be displayed at a second playback rate that is substantially the same as the second-stream rate;
means for discarding the data received from the second stream; and
means for entering, after receiving each of the burst transmissions from the first stream during the at least two active periods of time, the power saving mode for corresponding fixed and periodic power-saving periods of time while waiting for another burst from the first stream, the power-saving periods of time having a second common length of time determined prior to a first of the active periods of time.

10. The apparatus of claim 9, further configured to exit the power saving mode at a time that is based on an expected arrival time of the burst transmission.

11. The apparatus of claim 9, further configured to determine that the received data from the second stream does not belong to a stream of data that is of interest.

12. The apparatus of claim 9, wherein said apparatus is a receiver of a portable playback device.

13. The apparatus of claim 9, wherein said apparatus operates at reduced power consumption compared to a configuration in which said apparatus is operated continuously.

14. The apparatus of claim 9, wherein:
the means for receiving the burst transmission is configured to receive the burst transmission from the first stream at the receiver over the continuous-mode transmission system in a vestigial side-band modulation format, and
the means for receiving the data is configured to receive the data from the second stream at the receiver over the continuous-mode transmission system in the vestigial side-band modulation format.

15. The apparatus of claim 9, wherein the burst transmissions use a data structure that includes a synchronization segment containing data usable by a receiver to synchronize with the burst transmissions.

16. A non-transitory computer-readable medium having stored thereon a plurality of instructions for performing:
exiting a power saving mode at least two times for corresponding fixed and periodic active periods of time at a receiver in order to receive a separate burst transmission from a first stream during each of the corresponding active periods of time, the active periods of time having a first common length of time determined prior to a first of the active periods of time;
receiving, during the active periods of time, the burst transmissions from the first stream at the receiver, the burst transmissions being received over a continuous-mode transmission system, wherein the first stream is received by the receiver at a first-stream burst data rate, and the first stream includes data configured to be displayed at a first playback rate that is substantially less than the first-stream burst data rate;
receiving, during the active periods of time, data from a second stream at the receiver, the data from the second stream being received over the continuous-mode transmission system, wherein the second stream is received by the receiver at a second-stream rate, and the second stream includes data configured to be displayed at a second playback rate that is substantially the same as the second-stream rate;
discarding the data received from the second stream; and
entering, after receiving each of the burst transmissions from the first stream during the at least two active periods of time, the power saving mode for corresponding fixed and periodic power-saving periods of time while waiting for another burst from the first stream, the power-saving periods of time having a second common length of time determined prior to a first of the active periods of time.

17. The medium of claim 16, wherein:
the burst transmission from the first stream is received at the receiver over the continuous-mode transmission system in a vestigial side-band modulation format, and
the data from the second stream is received at the receiver over the continuous-mode transmission system in the vestigial side-band modulation format.

18. The medium of claim 16, wherein the burst transmissions use a data structure that includes a synchronization segment containing data usable by a receiver to synchronize with the burst transmissions.

* * * * *